March 22, 1966  C. B. SHIVERS, JR., ETAL  3,242,473
APPARATUS FOR DETECTING THE PRESENCE OF WATER
AND ICE IN THE FUEL SYSTEMS OF AIRCRAFT
Filed July 23, 1963  2 Sheets-Sheet 1
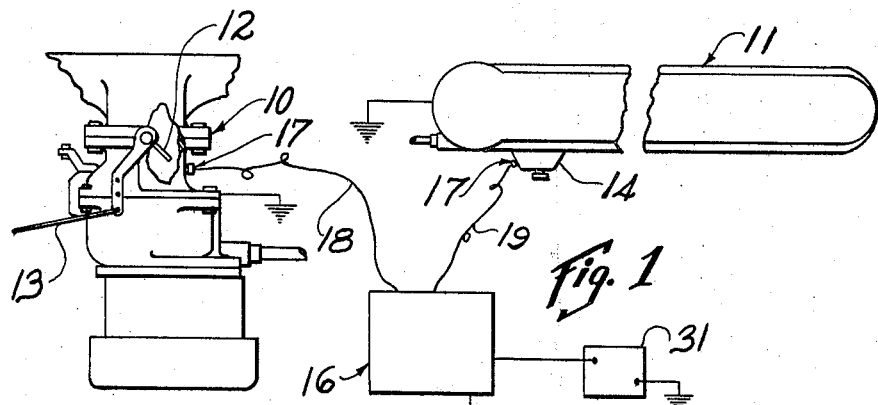
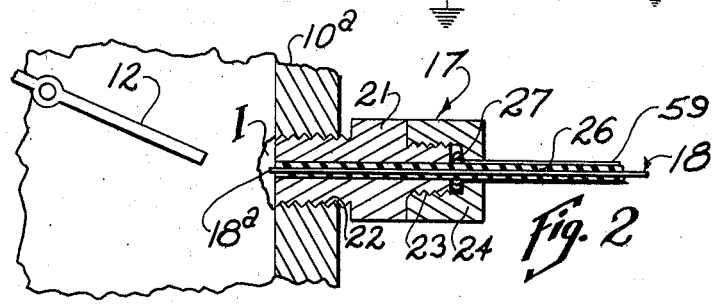
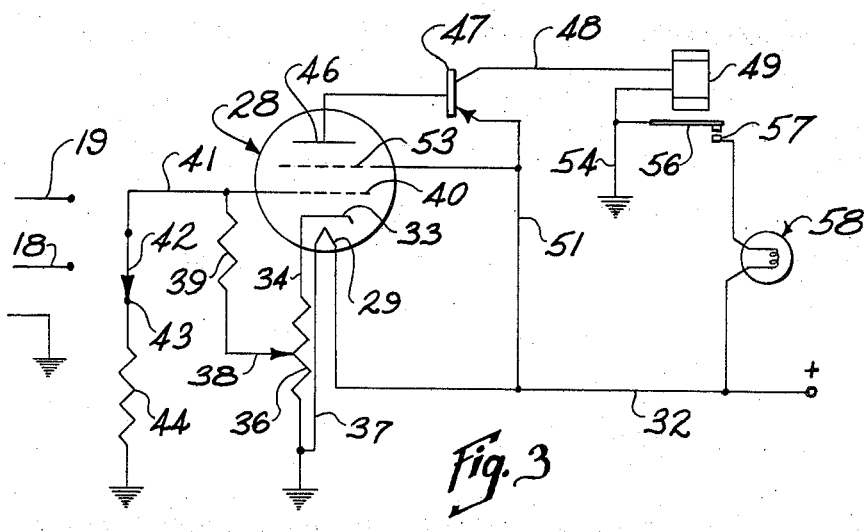
INVENTORS
Charles B. Shivers, Jr.
BY Claude H. Dorough
Jennings Carter & Thompson
Attorneys March 22, 1966 C. B. SHIVERS, JR., ETAL 3,242,473
APPARATUS FOR DETECTING THE PRESENCE OF WATER
AND ICE IN THE FUEL SYSTEMS OF AIRCRAFT
Filed July 23, 1963 2 Sheets-Sheet 2
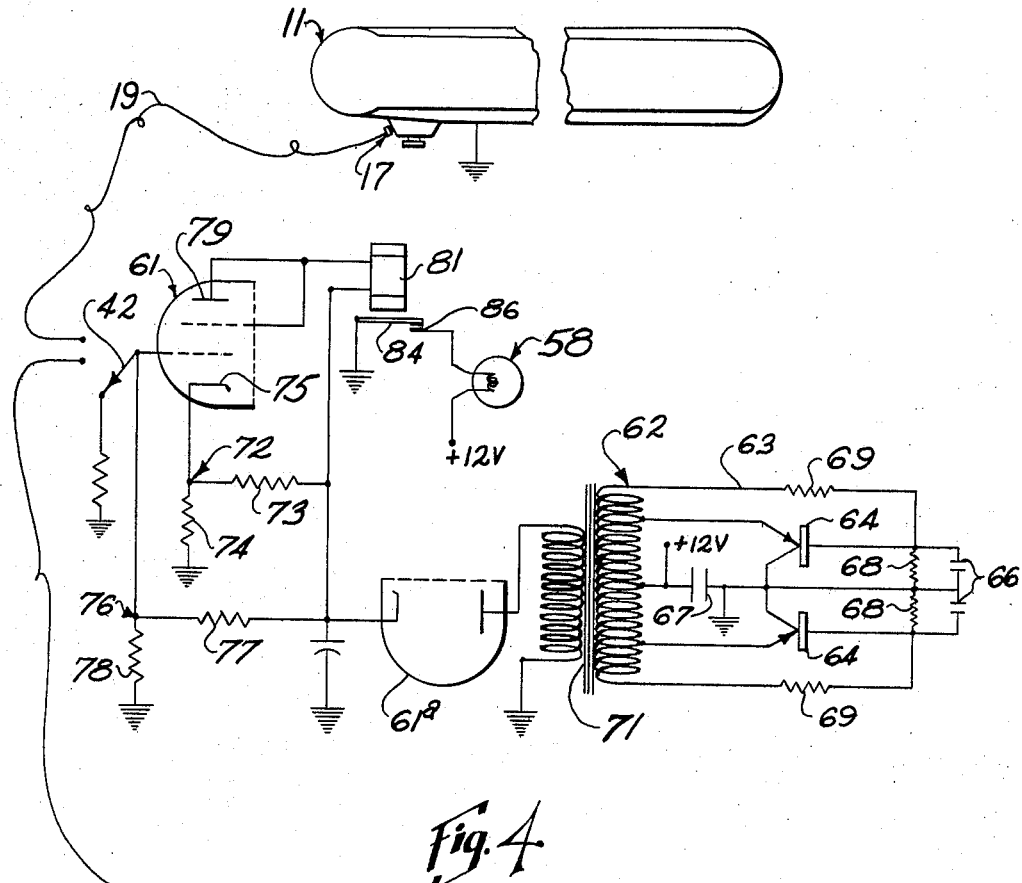
Fig. 4
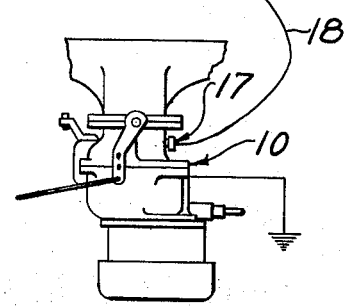
INVENTORS
Charles B. Shivers, Jr.
BY Claude H. Dorough
Jennings Carter & Thompson
Attorneys

United States Patent Office 3,242,473
Patented Mar. 22, 1966

3,242,473
APPARATUS FOR DETECTING THE PRESENCE OF WATER AND ICE IN THE FUEL SYSTEMS OF AIRCRAFT
Charles B. Shivers, Jr., 8928 Valley Brook Road, and Claude H. Dorough, 1539 Druid Hill Road, both of Birmingham, Ala.
Filed July 23, 1963, Ser. No. 297,041
2 Claims. (Cl. 340—234)

Our invention relates to means for detecting the presence of water and ice in the fuel systems of aircraft, namely, in the throat of the carburetor and in the sump of the fuel tanks, fuel strainers and the like.

It is known that in the operation of aircraft one of the serious problems which can be present under almost any conditions is the existence of water, either in liquid or solid state, in certain portions of the fuel systems. Thus, in the sumps of the fuel tanks, or the strainers, gascolators and the like, water may be either in the liquid form or may exist as ice. In the throat of the carburetor, even though there be no water in the fuel itself, ice may form from atmospheric moisture due to the reduction of temperature occasioned by the vaporization of the fuel, or low outside ambient temperatures, or both.

Efforts heretofore have been made to solve this problem. The systems with which we are familiar have attempted to energize a signal, or, to apply carburetor heat, by changing the capacitance of an electric circuit. Thus, it has been proposed to place in the wall of the carburetor adjacent the throat a series of condensers, so that when ice forms on the condensers the circuit is unbalanced, permitting a relay to drop in thus to give a signal, or automatically through other means to apply carburetor heat to melt the ice in the carburetor. Insofar as we are aware these systems have not proved to be entirely practical. We attribute this at least in part to the inherent inaccuracy of the changes in capacitance of condensers in the presence of ice which coats them. Further, the strength of such signals and consequently the dependability of the system as a whole varies for many reasons such as changes in ambient temperature, super cooling of the ice on the plates of the condensers and the electrical charging effect on the condensers of air flowing about such condensers.

In view of the foregoing an object of our invention is to provide a system which may be quickly, economically and easily installed in the aircraft and which will signal the presence of ice and water in the fuel system, or ice in the carburetor.

Another object of our invention is to provide a system of the character designated in which the signal means is responsive to a change in resistance in the circuit occasioned by the presence over a probe of either water, as distinguished from gasoline, or ice, as distinguished from gasoline, or ice as distinguished from air or vaporized gas mixture in the carburetor.

A further object of our invention is to provide a system which is essentially free of resistance varying factors other than the presence of water and ice, and one which will operate within the normal range of temperatures generally encountered in the operation of aircraft.

Briefly, our invention comprises essentially an insulated probe, preferably two of the same. One of these is placed in the sump of the fuel tank and another is placed in the throat of the carburetor, at the place where ice generally forms therein, namely, near the butterfly valve. These probes are electrically connected to a circuit within which is included a signal means, and the circuit is balanced so that the signal is inoperative until either water or ice forms in the fuel tank sump, or other place where that probe is placed, or until ice forms around the probe in the carburetor. In either case, the resistance of the circuit is changed and we employ a vacuum tube to pass this signal to a relay which in turn closes to energize the signal system which may be in the form of a light, or an audible signal such as a buzzer or the like.

In the preferred embodiments of our invention we provide a circuit in which the relay is kept on when there is no ice or water around the probe, but when ice or water forms at the probe the relay drops out and the signal system is energized.

Apparatus illustrating features of our invention is shown in the accompanying drawings, forming a part of this application, in which:

FIG. 1 is a diagrammatic view illustrating the complete system in association with a carburetor and the sump of a fuel tank;

FIG. 2 is an enlarged detail sectional view of one of the probes;

FIG. 3 is a wiring diagram for one embodiment of our invention; and,

FIG. 4 is a wiring diagram for another embodiment of our invention.

Referring now to the drawings for a better understanding of our invention we show in FIG. 1 an aircraft carburetor indicated generally by the numeral 10 and an aircraft fuel tank indicated by the numeral 11. As will be understood, the carburetor has a butterfly valve 12 operated through the usual pull wire 13, the carburetor selected for illustration being an updraft one. The fuel tank 10 is provided with a sump 14 located at the lowest point therein.

At 16 we show in block form only the control mechanism of the apparatus.

Mounted in the fuel sump 14 is one of our improved probes 17, while a similar probe 17 is mounted through a wall of the carburetor 10 in the area of the butterfly valve 12 as shown particularly in FIG. 2. The probes are connected to the control mechanism 16 through leads 18 and 19. In view of the fact that the probes are identical, a description of one will suffice for both.

As best shown in FIG. 2, each probe may comprise a fitting 21 threaded as at 22 into a side wall of the carburetor body 10a. The fitting 21 may also be threaded as at 23 to receive a cap 24.

Passing centrally through the fitting 21 and the cap 24 is one of the leads 18 or 19, as the case may be. The wire is suitably insulated by a sheath of material 26. Further, the wire 18 may be mounted relative to the fitting 21 by means of a brass ferrule or the like 27 which, when the cap 24 is screwed on, is squeezed and compresses about the insulation 26, thus to hold the end 18a of the wire projecting slightly past the insulation thereof.

In FIG. 3 we show one embodiment of our invention including a vacuum tube 28 which in effect may be one-half of a 12DL8 tube. The heater element 29 is supplied with current from the positive side of the battery 31, through the line 32. The cathode 33 may be connected by a line 34 to one end of a variable resistor 36, and thence to ground as indicated. The heater may be connected as shown to line 32 and to ground through a line 37. The slide wire 38 is connected through a resistor 39 to a line 41 leading to the grid 40 of the tube. The line 41 may connect to the stationary side of a three-way switch 42. One terminal 43 of the switch leads through a resistor 44 to ground as shown. The switch may be moved manually to connect into the circuit either the resistor 44 or the leads 18 and 19 leading to the probes 17.

The plate 46 of the tube 28 is connected to the base of a transistor 47. The collector of the transistor is connected through a lead 48 to one side of a relay coil 49. The emitter of the transistor is connected through a line 51 both through the line 32 and to the shield 53 of the vacuum tube 28. The other terminal of the coil 49 is connected to ground through a lead 54. The relay is provided with a switch arm 56 which is effective to close a contact point against a stationary contact 57. An incandescent lamp or other signal device 58 is connected as indicated so that upon closing of the contact points by downward movement of switch arm 56, a signal is emitted.

With the system installed and with the probes 17 in place, it will be seen that by manually moving the switch 42 we can either place it as shown in FIG. 3, which is the test position, whereupon the tube is biased below cut-off and no current will flow to the coil 49, which drops out, thus energizing lamp 58, or, we can move it manually to connect either the line 18 or the line 19 in the circuit. If desired, the switch could be left connected to either 18 or 19, at all times during the flight.

Assuming that the switch 42 is connected to line 18, and assuming that ice forms in the carburetor air intake as indicated at I, FIG. 2, it will be seen that the ice becomes a part of the circuit between the wire 18 and ground, it being understood that the carburetor body itself is grounded. By use of the variable resistor 36 we are enabled to balance these systems so that current flows so long as there is no ice at the place indicated in FIG. 2, or no ice or water in the sump of a fuel tank 11. That is, our system operates upon the principle of using the water or ice, as the case may be, as the medium to complete a circuit to bias the tube below cut-off. We have found that the system can be so balanced that the normal flow of vaporized fuel by the probe 17 in the carburetor wall will not cause a change of current in the circuit, and that the resistance of fuel such as gasoline is so much greater than the water that when gasoline surrounds the end of the probe in the fuel sump 14, no current flows between 42 and ground. Thus, since ice offers less resistance than the fuel-air mixture flowing up the carburetor, and since water offers less resistance than fuel such as gasoline, the presence of either ice or water across the ends of the probes is effective to allow the current to flow in the probe thus producing a voltage drop at the grid, thus to close the contact points 56 and 57 and give the signal desired. In other words, the bias of the tube will be lowered sufficiently, in the presence of ice or water, to cut off the current in the tube, thereby to close the relay points.

As specific examples of components used in the above circuit, which we have found to be entirely practical in detecting the presence of water or ice down to a temperature of +20° F., we cite the following: using a power supply of 12 volts, the resistor 44 can be 22 megohms, one-quarter watt; resistor 39, 10 megohms, one-half watt; resistor 36, 200 ohms. Transistor 47 may be a 2N321 or 2N270, Radio Corporation of America. As stated, the tube 28 may be one-half of a 12DL8. The relay coil 49 may be rated at 6 volts D.C., 360 ohms resistance. The wires forming the probes may be 18 gauge, stranded, surrounded by a "Teflon" insulation sheath. Also, we prefer to surround the "Teflon" insulation of the leads 18 and 19 with a coaxial shield 59. While we have shown the variable resistor 36 in this circuit to balance the same, it will be understood that by selecting the components of the circuit for a particular installation it would be possible to omit this resistor.

In FIG. 4 we show another embodiment of our invention that is particularly adapted for detection of supercooled ice in the carburetor down to temperatures in the range of −6° F. This second embodiment utilizes a more sensitive circuit and requires a higher operating voltage. As shown we provide a vacuum tube 61 which in effect may be the pentode half of a 117N7GT tube. The required voltage may be supplied by an oscillator-transformer power supply, indicated at 62 in which the D.C. current from the 12 volt power supply is converted to an A.C. current in the transistorized oscillator 63, which may be a common push-pull oscillator comprising the transistors 64, capacitors 66 and 67 and resistors 68 and 69.

The A.C. current is stepped up to the required 117 volts in the transformer 71 and is introduced into the operating circuit of the device through a diode 61a which may be the diode half of the above mentioned 117N7GT tube. The diode 61a acts as a rectifier to provide a D.C. current to the circuit.

A voltage divider 72, comprising the resistor 73 and 74, provides the proper operating bias for the cathode 75 of the pentode 61. A second voltage divider 76, comprising the resistors 77 and 78 provides a grid bias that is slightly positive as compared to the cathode bias, thereby holding the tube above cut-off. The plate 79 of the tube 61 is connected through a relay coil 81 which is connected to the cathode of the diode 61a.

The relay is provided with a switch arm 84 which is effective to close a contact point against a stationary contact 86. An incandescent lamp or other signal device 58 is connected as indicated so that upon closing of the contact points by downward movement of the switch arm 84, a signal is emitted.

A three-way switch 42 may be connected to one or the other of the leads 18 or 19 to one of the probes 17 in the tank sump 14 or the carburetor 10. The presence of ice or water at the end 18a of the probe 17 changes the effect of the voltage divider 76 in that the ice or water acts as another resistance added in parallel with the resistor 78. The effect of resistances in parallel may be computed from the equation $$\frac{1}{R} = \frac{1}{R_1} + \frac{1}{R_2}$$

where R is the effective resistance of two resistors having values of $R_1$ and $R_2$. From this equation it can be shown that if $R_1$ is the value of the resistor 78 and is constant the value of R will be between 0 and $R_1$ as $R_2$, the resistance of water or ice, varies between zero and infinity. This lowering of the effective value of the resistance of the grounded arm of the voltage divider 76 changes the bias of the grid. Values for the resistors 77 and 78 in the voltage divider 76, and 73 and 74 in the voltage divider 72 are selected so that the presence of water or ice at probe 17 will change the bias of the grid in the tube 61, thereby causing the relay 81 to drop out, whereby arm 84 moves so as to close the contacts at 86 thereby to activate the signal means 58.

As specific examples of components used in the second embodiment of our invention and which we have found to be entirely practical in detecting the presence of ice super-cooled down to temperatures in the range of −6° F., we cite the following: using a 12 volt power supply oscillator, transistors 64 can be Delco 2N278; resistors 68, 200 ohm, 10 watt; resistors 69, 2 ohm, 5 watt; capacitors 66, 2 microfarad, 5 w.v.; and capacitor 67, 250 microfarad, 25 w.v. The transformer may be any of several appropriate transformers on the market. As stated above, the vacuum tube may be the pentode-diode 117N7GT. The cathode voltage divider 72 may comprise the resistor 73, 10,000 ohm, 2 watt; and resistor 74, 270 ohm, 2 watt. The grid bias voltage divider 76 may comprise the resistor 77, 20 megohm, ½ watt; and resistor 78, 10 megohm, ½ watt. The relay coil and probes may be the same as in the first embodiment described above and capacitor 86 is provided to ground stray A.C. currents on the control side of the diode. In FIG. 4 of the drawing we have omitted the heater elements in the tubes for the sake of clarity.

From the foregoing the method of constructing and using our improved system will be apparent. By the simple provision of tapped holes in the carburetor wall and a tapped hole in the sump 14, the probes are inserted. By manual operation of switch 42 in the position shown in FIGS. 3 and 4, one may obtain a test, thus to be sure that the entire system is operating. By moving the switch 42 either to connect line 19 or line 18 in circuit, one may obtain tests, respectively, of the water or ice condition in the sump or the ice condition in the carburetor.

From the foregoing it will be apparent that we have devised an improved system for the detection of water and ice in aircraft fuel systems. In actual practice our invention has proved extremely practical. In use one may leave the switch 42 connected to either 18 or 19 and in actual practice, since the formation of ice in the carburetor is the most frequent difficulty encountered, the switch should be left with the line 18 in the circuit. In this manner the pilot will be advised immediately upon the formation of ice in the carburetor so that he may manually apply carburetor heat, or take other measures to dissipate it.

Unless specifically stated to the contrary in the appended claims the expression "body of water" or similar terms is intended to include water in the liquid or frozen state. Further, within the meaning of the claims the expression "signal means" is intended to cover means to signal the pilot or means to apply carburetor heat or the like, or both.

While we have shown our invention in two forms, it will be obvious to those skilled in the art that it is not so limited but is susceptible of various other changes and modifications without departing from the spirit thereof, and we desire, therefore, that only such limitations shall be placed thereupon as are specifically set forth in the appended claims.

What we claim is:
1. In apparatus for detecting the presence of ice in the air passage of an internal combustion engine carburetor,
   (a) an open electric circuit within which is included a source of E.M.F. and a signal means,
   (b) a probe extending beyond and spaced from an inner wall of the carburetor defining said air passage and located in that portion of the passage where the detection of the presence of ice is desired and disposed in position for ice formed in said portion of the passage to cling to the probe and simultaneously contact the carburetor wall, and
   (c) means to include in said circuit the probe, the carburetor wall, and the ice in contact therewith, whereby the circuit is closed by the ice, thus to energize the signal means.

2. In apparatus for detecting the formation of ice in the air passage of the carbuertor of an internal combustion engine,
   (a) an electrical conductor insulated from the carburetor extending beyond the inner wall of the carburetor defining said air passage and having a portion in position for ice formed about said portion of the conductor to bridge over between the conductor and the carburetor,
   (b) electric circuits including said conductor, the carburetor, a signal means and a source of E.M.F.
   (c) means effective to prevent the passage of sufficient current in said circuit to energize the signal means, and
   (d) means effective to overcome said current flow preventing means upon the presence of said bridge of ice between the conductor and the carburetor.

References Cited by the Examiner
UNITED STATES PATENTS

| | | | |
|---|---|---|---|
| 2,558,063 | 6/1951 | Seyffert | 324—65 X |
| 2,632,308 | 3/1953 | Engelhardt | 62—139 |
| 2,941,061 | 6/1960 | Bowers | 340—234 X |
| 3,141,129 | 7/1964 | Dietert | 340—235 X |

NEIL C. READ, *Primary Examiner.*

R. M. ANGUS, *Assistant Examiner.*